Dec. 1, 1970 M. E. SALLACH ET AL 3,544,967

CODE TRANSLATION AND CONTROL SYSTEM FOR PRINTING MACHINES AND THE LIKE

Filed June 20, 1967 4 Sheets-Sheet 1

INVENTORS.
MAX E. SALLACH
DONALD N. HEISNER
ROBERT G. BAKER

BY Russell L. Root
ATTY.

Dec. 1, 1970 M. E. SALLACH ET AL 3,544,967

CODE TRANSLATION AND CONTROL SYSTEM FOR PRINTING MACHINES AND THE LIKE

Filed June 20, 1967 4 Sheets-Sheet 2

INVENTORS.
MAX E. SALLACH
DONALD N. HEISNER
ROBERT G. BAKER

BY Russell L. Root
Atty.

INVENTORS.
MAX E. SALLACH
DONALD N. HEISNER
ROBERT G. BAKER
BY Russell L. Root
ATTY.

United States Patent Office 3,544,967
Patented Dec. 1, 1970

3,544,967

CODE TRANSLATION AND CONTROL SYSTEM FOR PRINTING MACHINES AND THE LIKE

Max E. Sallach, Chesterland, and Donald N. Heisner and Robert G. Baker, Mentor, Ohio, assignors to Addressograph Multigraph Corporation, Cleveland, Ohio, a corporation of Delaware

Filed June 20, 1967, Ser. No. 647,460
Int. Cl. G06f *3/00*
U.S. Cl. 340—172.5 12 Claims

ABSTRACT OF THE DISCLOSURE

A data conversion machine using machine-read bar code data from individual record members to control an output device such as a Teletype printer, a card punch, or the like; each record member carries a data message constituting a predetermined number of code characters. The machine includes a conventional card feed for feeding record cards one by one through a sensing station, the sensing station including an array of individual photocells or other sensing devices for scanning the bar code data on the record cards. The sensing devices are electrically coupled to a code memory, comprising a shift register, the data from the shift register memory being applied to an output interface circuit that translates the bar code to a working code for controlling the output device. Separate code generators are provided to add special control codes to the data from the record cards both at the beginning of a card sensing operation and at the end thereof to afford more complete control for the printer or other output. The sensing devices are also connected to a parity check circuit that determines whether the number of code elements in each sensed code character corresponds or fails to correspond to a given parity condition, the parity circuit developing parity and non-parity signals indicative of these conditions. The parity signal actuates a first blanking means that effectively blanks the sensing devices, whenever parity is found, for a period of time long enough to permit the code character being sensed to clear the sensing station. The non-parity signal actuates a second blanking means that blanks the sensing devices for a much shorter time interval. A counter is connected to the shift register memory to count the number of code characters recorded and the number of shift operations required to move the recorded code data completely through the shift register, this counter being connected to adjustable message length switches that may be set for a message length of a given number of code characters corresponding to the number of code characters on each record member. Operation of the output device is initiated only when the first special control code reaches the end of the shift register memory in timed coincidence with a count related to the correct number of code characters in the message, both reading errors and output operational errors being detected on the basis of information supplied from the counter and the message length switches.

CROSS REFERENCE TO RELATED APPLICATIONS

The complete data conversion system disclosed in the present application is also disclosed in the co-pending application of L. R. McMillen filed concurrently herewith. The present application is directed to the data storage and conversion apparatus of the system whereas the aforesaid copending application relates primarily to the scanning apparatus and particularly the parity control for the system.

BACKGROUND OF THE INVENTION

In many fields of application, and particularly in accounting systems and other systems using business machines that require code data inputs, it is necessary or desirable to operate a machine in accordance with diode data that is encoded in a different code from that required by the machine. For example, individual credit transactions may be encoded, at the point of purchase, in accordance with a particular code having advantages as applied to some forms of equipment that must subsequently use the data while, at the same time, the same data may be required for recording or utilization by other equipment that employs a different input code. The control systems that translate the data from one code to another and actuate the printing machines, punches, magnetic recorders, or other output devices requiring different codes, frequently introduce substantial errors into the data. Moreover, the code translation control systems employed are often bulky and expensive, particularly because a memory unit of substantial capacity is frequently required. Moreover, the memory unit of a code translation control system of this kind is often a prime source of error in the operation of the apparatus.

A shift register is one form of memory that has not been utilized in code translation control systems of the kind discussed above, particularly because of difficulties in checking the performance of the shift register memory while monitoring the accuracy of the data sensing apparatus and the code translation apparatus of the system. But shift register memory devices are substantially smaller in size and considerably less expensive than the memory units that have been employed for systems of this kind. In particular, a shift register memory having an adequate capacity for most business machine applications can be constructed with a size many times smaller than conventional storage devices used in equipment of this kind, such as magnetic core storage devices or individual flip-flop circuit storage registers. This is particularly true where integrated circuits, such as those employing field effect transistors, constitute the basis for the shift register memory.

One principal problem, in connection with systems of this kind, is the determination of errors in the recording of the data in the memory unit, together with the determination of errors resulting from poor recording of the input data. Errors of this kind may result in the loss of data at the time of recording in the memory unit or in the recording or spurious data that is not actually present in a correct input data message. Other sources of error occur in the readout operation from the memory circuit, as might be occasioned by application of an extraneous shift pulse to a shift pulse memory or similar malfunctions of the system. The problem to which the present invention is directed, in essence, is the utilization of a shift register memory in a code conversion control system for a high speed printer, card punch, magnetic tape recorder, or other output device that effectively and inherently checks for errors in the input of data to the shift register memory, in the transmission of data through the memory, and in the readout of data from the memory. A typical example of the prior art improved upon by the present invention is the apparatus described and claimed in Pat. No. 3,069,075 to M. E. Sallach, issued Dec. 18, 1962.

SUMMARY OF THE INVENTION

It is a principal object of the present invention, therefore, to provide a new and improved control system for controlling a printing machine, punching machine, or other output device in response to data messages encoded in accordance with a first data code, utilizing a shift register memory to realize the savings in size and cost made possible by such a memory without at the same time engendering the errors and difficulties heretofore incident to the use of a shift register memory in equipment of this kind.

A more specific object of the invention is to provide for effective and inherent detection of errors in the recording of data, translation of data, and readout of data from a shift register memory in a control system for controlling a printing machine, punch, or other high speed output device. This object of the invention is in part realized by the recording of special code characters both at the beginning and at the end of each data message utilized to operate the control system.

Another object of the invention is to provide a control system for controlling a printing machine, punch, or other output device in response to data messages encoded in accordance with a first data code, entailing translation of that first data code to a second data code that meets the needs of the output device, using a shift register as the principal memory for the control system but with provision for adjustment of the system to accommodate input data messages of substantially different lengths.

Accordingly, the present invention relates to a control system for controlling a printing machine, punch, or other output device in response to data messages encoded in accordance with a first data code and each including a predetermined number of less than *n* data characters. The control system comprises a shift register having *n* stages, including an input stage and an output stage, with each stage including a given number of individual recording devices sufficient to record an entire code character; shift circuits interconnect the stages of the shift register by stepping data recorded therein from the input stage toward the output stage. Input circuit means, electrically coupled to the input stage of the shift register, is provided for recording a data message in the shift register, data character by data character, this input circuit means including means for applying a shift pulse signal to the shift circuits of the register each time a new data character is recorded and simultaneously advancing all recorded data one stage through the shift register. A clock source is provided for generating a clock signal, together with gate means for applying that clock signal to the shift circuits of the shift register during intervals in which no data message is being recorded in the shift register to advance recorded data to the output stage of the shift register and also to maintain the shift register in cleared condition after the last character of a message has been advanced through the output stage. An output interface circuit couples the output stage of the shift register to the output device and preferably includes code translation circuits controlled by the output stage of the shift register to translate the data message into a code directly usable by the output device. In the preferred construction, individual code generators are provided for recording lead and end code characters at the beginning and at the end of each data message as the message is recorded in the shift register. Error detection means, including a counter coupled to the shift register to count shift operations during advancement of the data to the output stage and during subsequent readout operations, are provided; the error detection means utilizes the end and lead code characters to detect inaccurate readout and read-in operations, respectively.

DESCRIPTION OF THE PREFERRED EMBODIMENT

Figure 1:
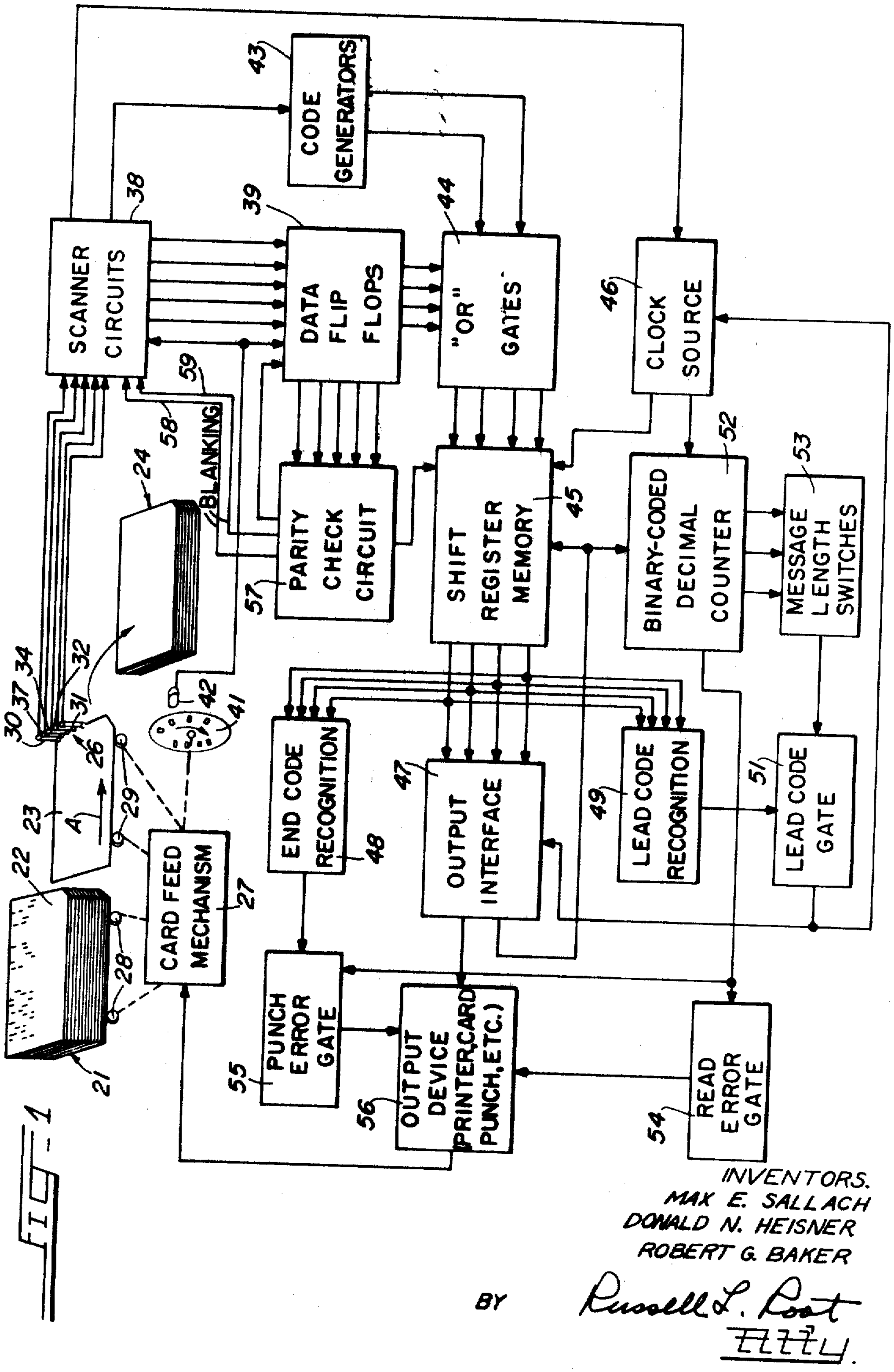
FIG. 1 is a block diagram of data conversion apparatus including a control system constructed in accordance with the present invention.

The business machine illustrated in block diagram form in FIG. 1 is a data conversion machine that includes a control system constructed in accordance with the present invention. In the data conversion machine, at the left-hand side of the drawing, there is a stack 21 of individual record members, the general form and configuration of the record members being apparent from the top record member or card 22 on the stack. One record member 23 that has been fed from the bottom of stack 21 is shown entering a sensing station 26. From the sensing station 26, the individual record members are deposited in a receiving or finished card stack 24.

The card feed mechanism 27 for the machine may be of generally conventional construction. It includes appropriate drive apparatus for driving feed rollers 28 located beneath the stack 21 to advance the individual record members toward the position of the member 23 in the drawing. Additional feed rollers 29, also driven from the mechanism 27, are employed to advance the record members through the sensing station 26 and on to the receiving stack 24. The card feed mechanism may include appropriate devices for limiting the feed of the record members to one record at a time; inasmuch as the mechanical construction of devices of this kind is well known in the art, no details of this structure are provided herein.

At the sensing station 26 there are a plurality of individual sensing devices comprising individual photocells 30, 31, 32, 34 and 37. These photocells are aligned with the positions of the individual code elements for code characters imprinted or otherwise formed on the record members 22. In the detail description provided hereinafter, it is assumed that the code characters on the record members constitute opaque markings of given width. However, it should be understood that punched holes may be utlizied as the code elements on the record members and that the configuration for the code elements may vary for different record-keeping systems.

The photocells 30, 31, 32, 34 and 37 are individually electrically coupled to a plurality of scanner circuits 38. The scanner circuits 38 include, in essence, individual coupling circuits for applying the electrical signals from the sensing devices to a series of data flip-flop circuits generally represented by the circuit unit 39 in FIG. 1.

The scanning system further includes a timing disc 41 that is driven in synchronism with operation of the card feed mechanism 27. The timing disc 41 is provided with a plurality of apertures which limit the illumination of a photocell 42 to predetermined time intervals in relation to the operating cycle of the card feed mechanisms. The photocell 42 is electrically connected to the data flip-flop circuits 39 to afford a timing and control signal for the flip-flop circuits.

In addition to the output connection from the scanner circuits 38 to the data flip-flop circuits 39, a further output connection is afforded from the scanner circuits to a code generator circuit unit 43. The code generator unit 43 may include two, three, or more individual circuits that are coupled to the OR gates 44 to develop special codes. One of these code generators develops a lead code indicative of the entry of the lead edge of a record member into the sensing station of the system. Another code generator develops a distinctive end code to indicate the completion of the sensing of an individual record member. For particular output devices coupled to the data conversion system of FIG. 1, additional special codes may be required as, for example, a line feed code to be incorporated in the code data immediately following the initial lead code.

The outputs from the OR circuits 44 are electrically coupled to a shift register memory unit 45. The shift register memory is also provided with a timing input signal from an appropriate clock source 46. The clock source 46 is controlled, in part, by an electrical signal supplied thereto from the scanner circuits 38.

The shift register memory 45 includes a plurality of output circuits that are individually coupled to an output interface unit 47, an end code recognition circuit 48, and a lead code recognition circuit 49. The output interface unit 47 includes a code translation circuit for translating the code data from the shift register memory 45 into a form directly usable by the particular output device to be actuated by the machine. The output interface unit 47 also includes control apparatus for starting, stopping, and other control operations with respect to the output device.

The lead code recognition circuit 49 is electrically connected to a lead code gate 51. The lead code gate 51 is also controlled by a binary coded decimal counter 52 that receives input signals from the output interface 47 and from the clock source 46. The counter 52 is electrically connected through one or more message length switches 53 to supply a gating signal to the lead code gate 51. The message length switches 53 are provided for the purpose of setting the system to operate in connection with code data on the record members that includes a specific number of individual code characters, and provide a means for adjusting the system for code messages of varying length.

The output from the lead code gate 51 is electrically connected to the ouput interface 47 to control the operation of the interface circuit in initiating a readout operation. The lead code gate 51 is also connected to the clock source 46 to control the application of clock pulses to the shift register memory 45.

In addition to its connection to the message length switches 53, the binary coded decimal counter 52 is electrically connected to a read error gate 54 and to a punch error gate 55. The punch error gate also includes an input connection from the end code recognition gate 48. The two error gates 54 and 55 and the output interface circuit 47 are all electrically connected to an output device 56. In a typical installation, the output device 56 may comprise a conventional printer such as a Teletype receiver, a card or tape punch, a magnetic tape recording unit, or any other apparatus in which the code information from the individual record members is to be utilized. The output device 56 is electrically or mechanically connected to the card feed mechanism 27 to control operation of the card feed.

Figure 2:
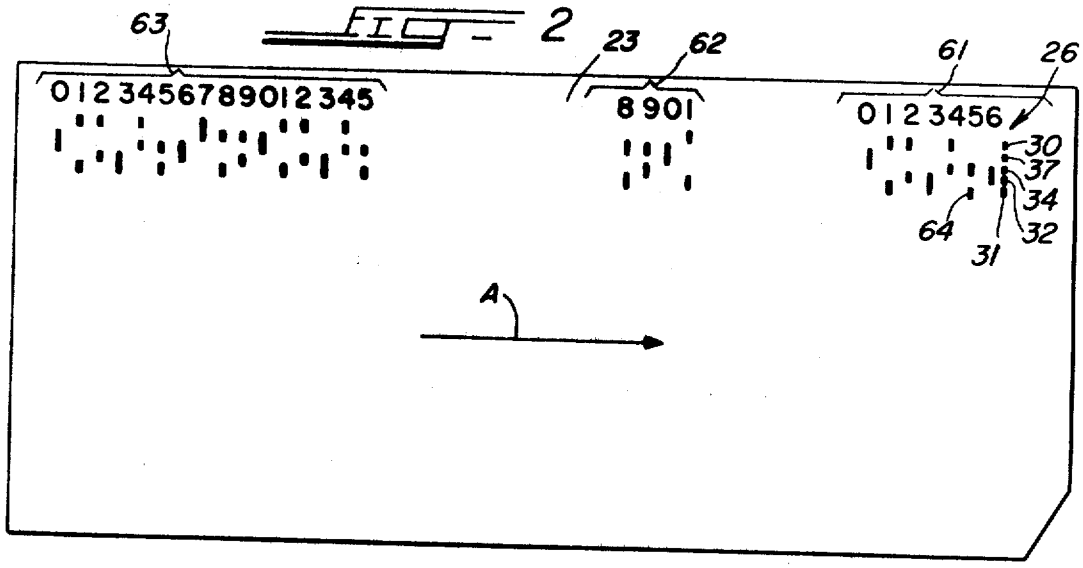
FIG. 2 illustrates a typical record member being scanned by the scanning devices in the conversion apparatus of FIG. 1.

Before describing the overall operation of the data conversion apparatus of FIG. 1, a specific data code and related arrangement for the sensing devices may first be considered. FIG 2 illustrates the individual record member 23 approaching the sensing station 26, in the direction indicated by the arrow A on a much larger scale than FIG. 1. The record member 23 carries three different groups 61, 62 and 63 of individual code characters. The code for the characters in groups 61–63 is one in which code character includes exactly two individual code elements. That is, the code adopted for this particular record member, and others to be used is the same scanning system, is one in which parity requirements are based upon the utilization of exactly two code elements in each code character. The representations for individual numerical values, in this particular code, are as follows:

TABLE I

| | Bar code position | | | | |
|---|---|---|---|---|---|
| | 1 | 2 | 4 | 7 | [1]0 |
| Data No.: | | | | | |
| 1 | | X | | | X |
| 2 | X | | | | X |
| 3 | X | X | | | |
| 4 | | | X | | X |
| 5 | X | | X | | |
| 6 | | X | X | | |
| 7 | | | | X | X |
| 8 | X | | | X | |
| 9 | | X | | X | |
| 0 | | | X | X | |

[1] Parity.

From Table I, it will be seen that the "zero" code position is used for parity purposes only and is not directly significant of the numerical value for the code character.

As shown in FIG. 2, the photocell 30 is aligned with the "zero" code elements on the record member 23 as the record card is advanced into and through the sensing station 26. The photocells 31, 32, 34 and 37 are aligned with the code positions for the numerical values one, two, four and seven, respectively.

Referring again to FIG. 1, when operation of the data conversion apparatus shown therein is initiated, the card feed mechanism 27 is actuated to feed a first card from the bottom of the stack 21 in the direction of the arrow A. The leading edge of the card is sensed by one or more of the photocells at sensing station 26, producing an output signal that is supplied to the scanner circuits 38 to condition the scanner circuits for a sensing operation. The lead-edge signal is also supplied, through scanner circuits 38, to the code generators 43. In a typical system, the code generators 43 first develop a specific lead code which is different from any of the data codes on the record members and this lead code is supplied to and recorded in the shift register memory 45, through the OR gates 44.

Before the first data code is sensed from the card 23, a second non-data code is recorded in the shift register memory. For example, if the output device 56 is a conventional printer such as a Teletype receiver, it may be desirable to effect a carriage return or line feed operation in the output device immediately prior to the recording of each group of data characters from the record members. To this end, a second distinctive code is developed by the code generators 43 and supplied through the OR gates 44 to be recorded in the shift register 45.

After the initial control codes have been recorded in the shift register memory (there may be more than two such codes, depending upon the particular output device employed and other considerations) the first code character on the record member 23 enters the sensing station 26. The code elements constituting the code character are sensed by the appropriate ones of the photocells 30, 31, 32, 34 and 37, developing output signals that are supplied through the scanning circuits 38 to the data flip-flop circuits 39. The data flip-flop circuits 39 develop characteristic output signals representative of the initial data signals from the scanner circuits and these output signals are supplied to the parity check circuit 57 and to the initial stage of the shift register 45 through OR gates 44. The parity circuit 57 determines whether the operating conditions of the individual data flip-flop circuits 39 indicate that exactly two code elements, representative of a code character corresponding to a parity condition, have been sensed. If the parity circuit 57 ascertains that a parity condition exists, a shift signal is supplied to the register 45 to record the code character in the shift register. A reset signal is also supplied to the data flip-flops 39, resetting the data flip-flops. At the same time, a blanking signal is supplied to the scanner circuits 38 through a first blanking circuit 58.

The blanking signal supplied to the scanning circuits 38, by means of circuit 58, inactivates the scanner circuits, and thus effectively inactivates the related sensing devices, for a predetermined time interval at least equal to the time required to advance the record member 23 one character width through the sensing station 26. That is, determination of a parity condition by the parity circuit 57 causes the parity circuit to develop a blanking signal that prevents any further scanning of the character that has been indicated to be a true character under the requisite parity code. The scanner circuits, and associated sensing devices, are held in blanked condition until the next code character on the record member 23 enters the sensing station 26.

In a normal operation, the sequence of steps set forth above continues for each scanned code character. Every time that the parity circuit 57 detects a true parity condition, with just two code elements present in a code character, the scanning system comprising the scanner circuits 38 and the sensing devices coupled thereto is blanked to prevent repetitive sensing of the same character.

It may happen, however, that an additional marking is superimposed on the correct code markings so that, for a given code character, three or more apparent code elements are sensed. When this occurs, the data signals supplied to the parity check circuit through the scanner circuits 38 and data flip-flops 39 result in a determination, in the parity circuit, that a non-parity condition exists. The data flip-flop circuits 39 are then reset from the parity check circuit without recording of information signals in the shift register 45. Furthermore, a blanking signal is supplied to the scanner circuits 38 over a second blanking means comprising an electrical circuit 59.

In this instance, however, the blanking signal supplied to the scanner circuits 38, through the second blanking circuit 59, is much shorter in duration than the blanking signal developed when a parity condition is recognized. For a non-parity condition, the blanking signal supplied to the scanner circuits 38 over the second blanking circuit 59 is made substantially shorter than the time required to advance the record member 23 one character width through the sensing station 26. Thus, the blanking signal is terminated before the character passes completely through the sensing station.

Upon termination of the short blanking signal on the circuit 59, the scanner circuits and the associated photocells 30, 31, 32, 34 and 37 again sense the same character that produced the non-parity output signals from parity check circuit 57. If the extraneous marking that produced the impression of a third code element on the initial scanning is not wide enough to be sensed in this second sensing of the same code character, a parity condition is ascertained by the parity circuit 57. As a consequence, a long-duration blanking signal is again supplied to the scanner circuit 38 to prevent further scanning of the same code character, a reset signal is supplied to the data flip-flop circuits 39 and the sensed character is recorded in the shift register memory 45, through the OR gates 44.

Of course, if the scanned code character consistently exhibits a non-parity condition for each scan thereof, the code character ultimately moves past the sensing station 26 with no data having been recorded in the shift register memory 45. Under these circumstances, the data previously recorded in the shift register memory may be advanced one stage by the signal from the clock source 46, which is required for each recording operation in the shift register memory. This leaves a totally blank position in the shift register memory which can be subsequently detected as a reading error. Alternatively, and preferably, the data in the shift register can be left without advancement, resulting in a discrepancy in the total number of character codes ultimately recorded from the record member. This discrepancy can be detected, by means of the counter 52 and the read error gate 54. A reading error of this kind can be used to trigger an alarm or to produce some other control effect to enable the machine operator to know that a defective reading operation has occurred. The net result is the same whether the non-parity condition results from an excess of marks present in any code character position or from a lack of code elements at any such position.

Where the code characters are arranged in groups such as the groups 61, 62 and 63 (FIG. 2) it is necessary to provide some means for preventing scanning operations in the spaces intermediate the code character groups, particularly in those instances where other data may be recorded on the record member. This is also true where the data conversion system is not intended to read all of the groups of data characters as, for example, in an instance in which it may be desirable to read the data groups 61 and 63 but to omit group 62. This is a principal function of the synchronizing disc 41 and the photocell 42, which limit operation of the data flip-flops 39 to those portions of the record members which contains the information to be sensed and employed in the control of the output device 56. The number and grouping of the apertures in the synchronizing disc 41 is selected to limit operation of the scanning system to those portions of the recorded data on the cards that is to be used in control of the output device.

When the trailing edge of the card 23 approaches the scanning station 26, a termination signal is developed by the synchronizing disc photocell 42 and passed through the scanner circuits 38 to the code generator unit 43. This signal, which may also be employed to inactivate the scanner circuits until the next card approaches the sensing station, causes the code generator unit to develop an additional characteristic code indicative of the end of a sensing operation. This separate code character, which is distinctively different from any of the data codes, is recorded in the shift register memory 45 through the OR gates 44.

When the scanning of the data from an individual card has been completed, the clock source 46 advances the recorded data rapidly through the shift register memory 45. The first code, it will be recalled, is the special lead code indicative of the beginning of the sensing operation. This code is recognized in the circuit 49 and produces an output signal that is supplied to the lead code gate 51. If the lead code signal recognition occurs in coincidence with an output signal from the message length switches 53, an actuating signal is supplied to the output interface circuit 47. The message length switches, which are preset to the expected length for each code message from the individual record members, work in conjunction with the counter 52 to assure that the number of code characters recorded in the shift register memory is the correct number for a given code message on an individual record member.

After recognition of the lead code, and assuming coincidence thereof with a correct count from circuits 52 and 53, the output interface circuit 47 is energized and receives, in sequence, the individual code characters previously recorded in the shift register memory 45. Any special codes from the code generators 43 that have been recorded prior to the recording of data from the record member, as described above, are first received and interpreted by the output interface circuit 47. These special codes may be utilized to control such functions in the output device 56 as a carriage return, paper advance, or the like. The character data codes follow immediately after the special control codes. These character data codes are translated in the output interface circuit 47 into an appropriate code for controlling the output device 56 and are supplied to the output device to control its operation.

As the recorded data is read out of the shift register memory 45, the count in counter 52 is continued. The final count in counter 52 should coincide with recognition of the special end code, which is identified by circuit 48.

If this count and the recognition of the end code occur in coincidence, operation of the output device 56 is terminated by means of the punch error gate 55 without further incident. If the end code is recognized at a time when the count from the counter 52 does not correspond to the correct count for the end of a message, the punch error gate actuates an appropriate alarm or otherwise conditions the output device 56 to indicate to the system operator that an error has occurred in the punching, printing, or other operation.

Upon completion of a printing, punching, or other output operation, an appropriate signal is developed by the output device 56 to actuate card feed mechanism 27, feeding another card toward the sensing station 26. Thus, the operation proceeds continuously as described above.

The present invention is concerned specifically with the control circuits of the data a conversion apparatus of FIG. 1, including particularly the shift register memory 45, the output interface 47, the special code recognition circuits 48 and 49, and the error gates 54 and 55, as well as the code generators 43. The scanning system, on the other hand, and particularly the parity check circuit 57, is the subject matter of the co-pending application of L. R. McMillen, filed concurrently herewith, to which reference may be made for details of the construction and operation of the scanning and parity control apparatus.

SPECIFIC LOGIC CIRCUITS FOR ONE EMBODIMENT OF THE INVENTION

Figure 3:
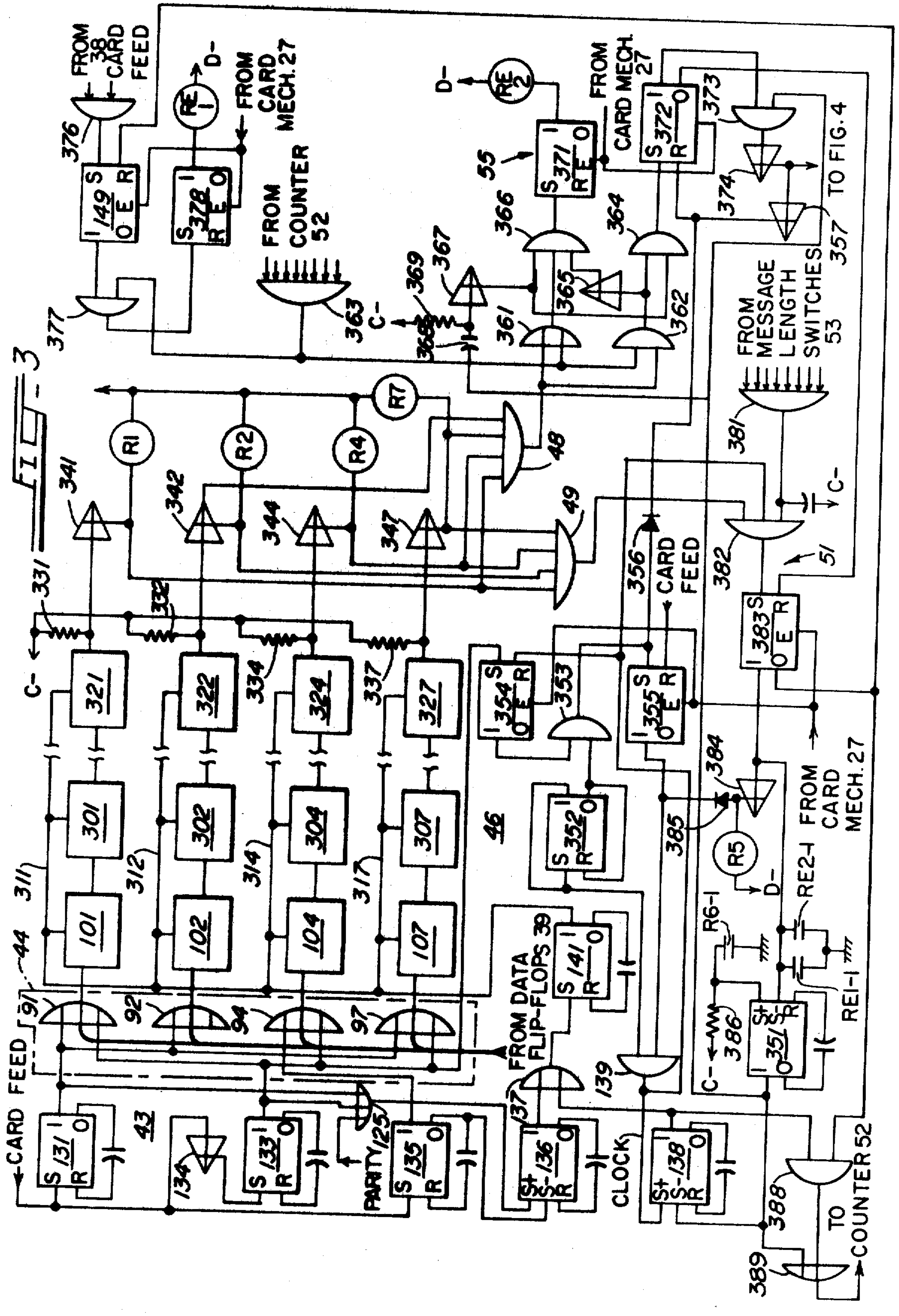
FIG. 3 is a logic diagram of a preferred construction for the control system of the present invention.

In the specific form of the circuits for the present invention as illustrated in FIG. 3, the OR gate unit 44 comprises only four OR circuits 91, 92, 94 and 97. There is no necessity for a fifth OR gate corresponding to the "zero" level of the recorded code data because it is not necessary to carry the parity information embodied in that code level forward into the shift register 45.

The output of the first OR gate 91 is electrically connected to a first recording device 101 in the initial stage of the shift register memory 45. Similarly, the OR gate 92 is connected to the input of an individual recording circuit 102 in the first stage of the shift register memory. The OR gates 94 and 97 are connected, respectively, to the inputs of two indvidual recording devices 104 and 107.

The shift register memory 45 may be of conventional construction. Preferably, integrated circuit construction is utilized, with each recording device such as the devices 101, 102, 104 and 107 constituting an individual field effect transistor with appropriate electrical connections. Each stage of the shift memory includes four individual recording devices, one for each level of the code information. Each of these devices, such as the device 101, has an output connected to the next succeeding recording device in the same code level but in the next stage of the shift register memory. Thus, the recording device 101 is electrically connected, at its output, to the device 301 in the next stage of the shift register memory. Similarly, the outputs of the devices 102, 104 and 107 are electrically connected to the devices 302, 304 and 307, respectively, in the next stage of the shift register. Transfer of recorded data from the first stage of the shift memory, comprising circuits 101, 102, 104 and 107, to the next stage, is effected by a pulse signal of appropriate polarity applied to four shift lines 311, 312, 314 and 317 for the four separate code levels of the shift register. Each of the shift lines is connected to all of the storage devices in its particular code level.

In a typical application, where the record members may include thirty, forty, or more code characters, the shift register memory 45 may include sixty or more stages. Assuming that there are $n$ stages in the shift register memory, the limitation on the code message length is that there must be somewhat less than $n$ code characters in each message. Since each stage is identical to the preceding stage, in the shift register memory 45, the intermediate stages have been omitted from FIG. 3, in which only the first and second stages and the output stage of the shift register memory are illustrated. The final or output stage of the shift register memory includes the recording devices 321, 322, 324 and 327. Using integrated circuits, as described above, four circuit units of small size can accommodate the complete shift register memory.

The output stage of the shift register memory 45 further includes a series of individual output circuits, one for each of the four final recording devices. Thus, the output terminal of the device 321 is electrically connected to an appropriate D.C. supply, designated as C—, by a resistor 331 which constitutes an input resistor for an amplifier 341. The output circuit for the storage device 322 is similar and includes a resistor 332 connecting the storage device to the C— supply and constituting an input resistor for an amplifier 342. The resistor 334 and the amplifier 344 are incorporated in the output circuit for the recording device 324 and the resistor 337 and the amplifier 347 comprise the output circuit for the recording device 327.

The output of the amplifier 341 is electrically connected to one terminal of a relay operating coil R1, the other terminal of the relay coil R1 being connected to an appropriate D.C. supply identified as D—. Additional output relays R2, R4 and R7 are similarly connected to the amplifiers 342, 344 and 347, respectively. The relays comprising the coils R1, R2, R4 and R7 are incorporated in the output interface unit 47 (FIG. 1) and are utilized as a part of a code translation apparatus explained more fully hereinafter in connection with FIG. 6.

The code generator circuits 43, in the form illustrated in FIG. 3, comprise a one-shot trigger circuit 131 that is automatically reset a predetermined time interval following setting of the circuit. The components of the trigger circuit 131, in a typical application, may be selected to provide for automatic reset after a time interval of 2.5 milliseconds. The set input to the trigger circuit 131 is a card feed signal that is derived from a card feed flip-flop circuit 132 described more fully hereinafter in connection with FIG. 4. The "one" output of the trigger circuit 131 is connected to one of the inputs for each of the OR circuits 91, 94 and 97. In addition, the "one" output of the trigger circuit 131 is electrically connected to one of the inputs for an OR circuit 125.

Another component of the code generator circuit unit, in the embodiment illustrated in FIG. 3, comprises a one-shot trigger circuit 133 that is utilized to develop a terminal or end-of-message code. The trigger circuit 133, in a typical construction, may provide for automatic reset some six milliseconds after the circuit has been set. The set input for the trigger circuit 133 is derived from an inverting amplifier 134, the input signal to the amplifier 134 being the card feed signal derived from the flip-flop circuit 132 of FIG. 4. The "one" output of the trigger circuit 133 is electrically connected to each of the OR circuits 91, 94 and 97 to produce a special end code 1, 4, 7. The "one" output of the trigger circuit 133 is also electrically connected to one of the inputs of the OR circuit 135. The third input to the OR circuit 125 is a parity signal that is derived from the parity check circuit 57 (FIG. 1).

Yet another component circuit for the code generator unit 43 is a one-shot trigger circuit 135, which, in this particular instance, is constructed to reset itself after a time interval of 700 microseconds. The set input to the trigger circuit 135 is the card feed signal. The "one" output of this trigger circuit is connected to one of the inputs for the OR circuit 94.

The output of the OR gate 125 is connected to one set input terminal for a one-shot trigger circuit 136. In the illustrated embodiment, the trigger circuit 136 is constructed to reset itself automatically after a time interval of 300 microseconds. The trigger circuit 136 is provided with a second set input that is electrically connected to the "zero" output of the one-shot circuit 135. The "one"

output terminal of the trigger circuit 136 is electrically connected to one input terminal of an OR gate 137.

The OR gate 137 is a part of a stepping circuit for advancing recorded data through the shift register memory 45. The second input to the OR circuit 137 is derived from the "one" output of a one-shot trigger circuit 138. For the illustrated system, the reset time for the trigger circuit 138 is approximately twenty-five microseconds. One set input to the trigger circuit 138 is taken from an AND circuit 139 that is the output circuit of the clock source 46. The trigger circuit 138 is provided with a second set input that is electrically connected to the "one" output of a one-shot trigger circuit 351 described more fully hereinafter.

The output of the OR circuit 137 is electrically connected to the set terminal of a one-shot trigger circuit 141. The trigger circuit 141 is constructed to afford a relatively short reset time; in the specific circuit shown, this reset time may be of the order of six microseconds. Thus, the trigger circuit 141 produces short-duration output pulses, and these output pulses are supplied to the shift lines 311, 312, 314 and 317 of the shift register 45, all of those shift lines being connected to the "one" output terminal of the trigger circuit 141.

The clock source 46, in the form illustrated in FIG. 3, includes a multivibrator circuit 352. The multivibrator circuit 352 may be of conventional construction with the "one" output terminal connected to the set terminal and the zero output terminal connected to the reset terminal. The circuit components may be selected, in a typical instance, to afford an operating frequency of approximately two thousand hertz. The "one" output terminal of the multi-vibrator 352 is electrically connected to one of the two inputs for the AND circuit 139.

The "zero" output terminal of the multivibrator 352 is electrically connected to one of two inputs for an AND circuit 353. The other input to the AND circuit 353 is supplied from the "one" output terminal of a flip-flop circuit 354. The set terminal of the flip-flop circuit 354 is connected to the output of the code generator flip-flop circuit 133. The reset terminal of the flip-flop circuit 354 derives its reset signal from the output of the AND circuit 139. An auxiliary reset terminal for the flip-flop circuit 354 is connected to a source of a separate reset signal that is derived from the card feed mechanism 27 (FIG. 1).

The clock source 46 further includes a flip-flop circuit 355 having its set terminal electrically connected to the output of the AND circuit 353. The set input to the flip-flop circuit 355 is also electrically connected through a diode 356 to an amplifier 357 that produces a signal indicative of completion of a cycle of operation on the part of the output device 56 (FIG. 1) as explained more fully hereinafter. The reset terminal for the flip-flop circuit 355 is actuated by the card feed signal from the flip-flop circuit 132 described hereinafter in connection with FIG. 4. The flip-flop circuit 355 is also provided with an auxiliary reset input from the card feed mechanism 27. The "one" output of the flip-flop circuit 355 is connected to the second input of the AND circuit 139.

In the logical circuit illustrated in FIG. 3, the end code recognition circuit 48 comprises an AND circuit having four individual inputs. One of the inputs to the AND circuit 48 is derived from the output amplifier 341 for the "one" code level of the shift register memory 45. Similarly, two additional inputs for the AND circuit 48 are taken from the output amplifiers 344 and 347 for the "4" and "7" levels of the shift register memory. The fourth input to the end code recognition gate 48 is taken from the output amplifier 342 for the "two" code level, but the electrical connection is such that the polarity is reversed, as compared with the connections to the "1," "4" and "7" levels of the shift memory. It is thus seen that the AND gate 48 is actuated in accordance with a data code comprising recorded bits in the "1," "4" and "7" levels of the shift register memory provided there is no data bit recorded in the "2" level of the memory.

The output of the end code recognition AND gate 48 is electrically connected to an OR circuit 361 and to an AND circuit 362. The OR circuit 361 has a second input that is taken from the output of an AND circuit 363. The AND circuit 363 is electrically connected to the counter 52 that maintains a summary count of the number of data codes recorded in the shift register memory 45 and of the number of shift pulses required to advance the lead code to the output stage of the shift register memory. The OR circuit 361 is a part of the punch error gate 55.

The AND circuit 362 is provided with a second input that is also connected to the output of the AND circuit 363. The output from the AND circuit 362 is electrically connected to one input of an AND circuit 364. The output from the AND circuit 362 is also electrically connected to an inverting amplifier 365 with the output of the amplifier 365 being connected to one of three inputs to an additional AND circuit 366 in the punch error gate circuit. A second input to the AND circuit 366 is taken from the output of the OR gate 361. The remaining inputs of the two AND circuits 364 and 366 are electrically connected to the output of an inverting amplifier 367. The input to the amplifier 367 is derived from the "one" output of the flip-flop circuit 351 through a circuit comprising a series capacitor 368 and shunt resistor 369, the resistor 369 being connected to the C— supply.

The output of the AND circuit 366 is electrically connected to the set terminal of a punch error flip-flop circuit 371. The "one" output terminal of the flip-flop circuit 371 is connected to one terminal of a relay operating coil RE2, the other terminal of the coil RE2 being connected to the D.C. supply D—. Energization of the relay coil RE2 is indicative of an error in the punching, printing, or other recording operations performed by the output device 56 as described more fully hereinafter. The flip-flop circuit 371 can be reset by an appropriate signal from the card feed mechanism 27.

The output of the AND gate 364 is electrically connected to the set terminal of a flip-flop circuit 372. The one output terminal of the flip-flop circuit 372 is electrically connected to an AND circuit 373 having a second input connected to the "one" output terminal of a flip-flop circuit 351 as described more fully hereinafter. The output of the AND circuit 373 is electrically connected to the input of an inverting amplifier 374. The output of the amplifier 374, which affords a signal indicative of the completion of the punching, printing, or similar operating cycle on the part of the output device controlled by the system, is electrically connected to the card feed mechanism and specifically to the card feed circuit illustrated in FIG. 4. The output of the amplifier 374 is also used to drive the succeeding amplifier 357. In addition to the connection to the flip-flop circuit 355 described above, the output of the amplifier 357 is connected to the reset input of the flip-flop circuit 372. The two flip-flop circuits 371 and 372 are also provided with an auxiliary reset input from the card feed mechanism 27.

The flip-flop circuit 149, located in the upper righthand corner of FIG. 3, has a set input that is derived from the output of an AND circuit 376. One of the two inputs to the AND circuit 376 is taken from the scanner circuits 38 (FIG. 1) and comprises a signal indicative of the entry of the leading edge of a record member into the scanning station 26. The other input to the AND circuit 376 is the card feed signal derived from the flip-flop 132 of FIG. 4.

The "one" output of the flip-flop circuit 149 is electrically connected to an AND circuit 377. The AND circuit 377 has a second input that is taken from the output from the predetermined count AND circuit 363. The output of the AND circuit 377 is electrically connected to the set input of a flip-flop circuit 378 that is a part of the read error gate 54. The "one" output of the flip-flop circuit 378 is electrically connected to a relay operating coil RE1 that is returned to the D— supply. Energization of the relay comprising the coil RE1 is indicative of the occurrence of a reading error as described more fully hereinafter. The two flip-flop circuits 149 and 378 are each provided with an auxiliary reset input from the card mechanism 27.

The message length switches 53 (FIG. 1) are electrically connected to an AND circuit 381 so that the AND circuit 381 produces an output signal in response to recording of a predetermined number of code characters in the shift register memory 45 (see FIG. 1). The output of the AND circuit 381 is electrically connected to one of three inputs of an AND circuit 382 that is a part of the lead gate 51. The second input to the AND gate 382 is derived from the AND circuit 139 in the output of the clock source 46. The third input to the AND gate 382 is taken from the output of an AND gate constituting the lead code recognition circuit 49. The AND gate 49 is provided with four individual inputs derived from the four amplifiers 341, 342, 344 and 347 in the output stages of the shift register memory 45.

The lead code gate 51, in the form illustrated in FIG. 3, further includes a flip-flop circuit 383 having its set input electrically connected to the output of the AND circuit 382. The reset terminal of the flip-flop circuit 383 is electrically connected to the zero output terminal of the flip-flop circuit 372. The zero output terminal for the flip-flop circuit 383 affords a reset signal for the flip-flop circuit 149. An auxiliary reset for the flip-flop circuit 383 is provided by a signal from the card feed mechanism 27.

The "one" output terminal of the flip-flop circuit 383 is electrically connected to the input of an inverting amplifier 384. The output of this amplifier is connected through a diode 385 to that input of the AND circuit 139 that is derived from the flip-flop circuit 355. In addition, the output of the amplifier 384 is electrically connected to one terminal of a relay operating coil R5 that is connected to the D— supply. The relay comprising the coil R5 is a part of the output interface unit 47 and is utilized to prevent an effective decoding operation unless and until the lead code has been recognized at a specified time, as described more fully hereinafter.

The "one" output terminal of the flip-flop circuit 383 in the lead code gate 51 is also electrically connected to one set input of the one-shot trigger circuit 351. This same set input for the one-shot trigger circuit 351 is electrically connected to two sets of normally open relay contacts RE1–1 and RE2–1 which are returned to system ground. There is an additional set input for the trigger circuit 351 that is electrically connected to the C— supply through a resistor 386, this second set input also being connected to a pair of normally open relay contacts R6–1 that are returned to ground. The relay contacts R6–1 are a part of a relay that is actuated at the end of each operating cycle for printing or punching an individual character in the operation of the output device 56, the relay R6 not being shown otherwise in the drawings.

The reset time for the one-shot trigger circuit 351 is dependent upon the time required for a full operating cycle of the output device 56. For example, if a conventional Teletype Model ASR 33 printer is employed as the output device, the reset time for the trigger circuit 351 may be of the order of 60 milliseconds. For a high speed punch, on the other hand, such as the IBM 024 or 026 punches, the reset time for the trigger circuit 351 may be of the order of 5 milliseconds.

The system of FIG. 3 further includes an AND circuit 388 having two inputs. One of the inputs is connected to the "one" output of the trigger circuit 138. The other input to AND circuit 388 is connected to the "zero" output of the flip-flop circuit 383. The output from the AND circuit 388 is connected to the counter 52 through an OR gate 389, the other input for the OR gate 389 being derived from the "one" output of the flip-flop circuit 351.

Figures 4, 5:
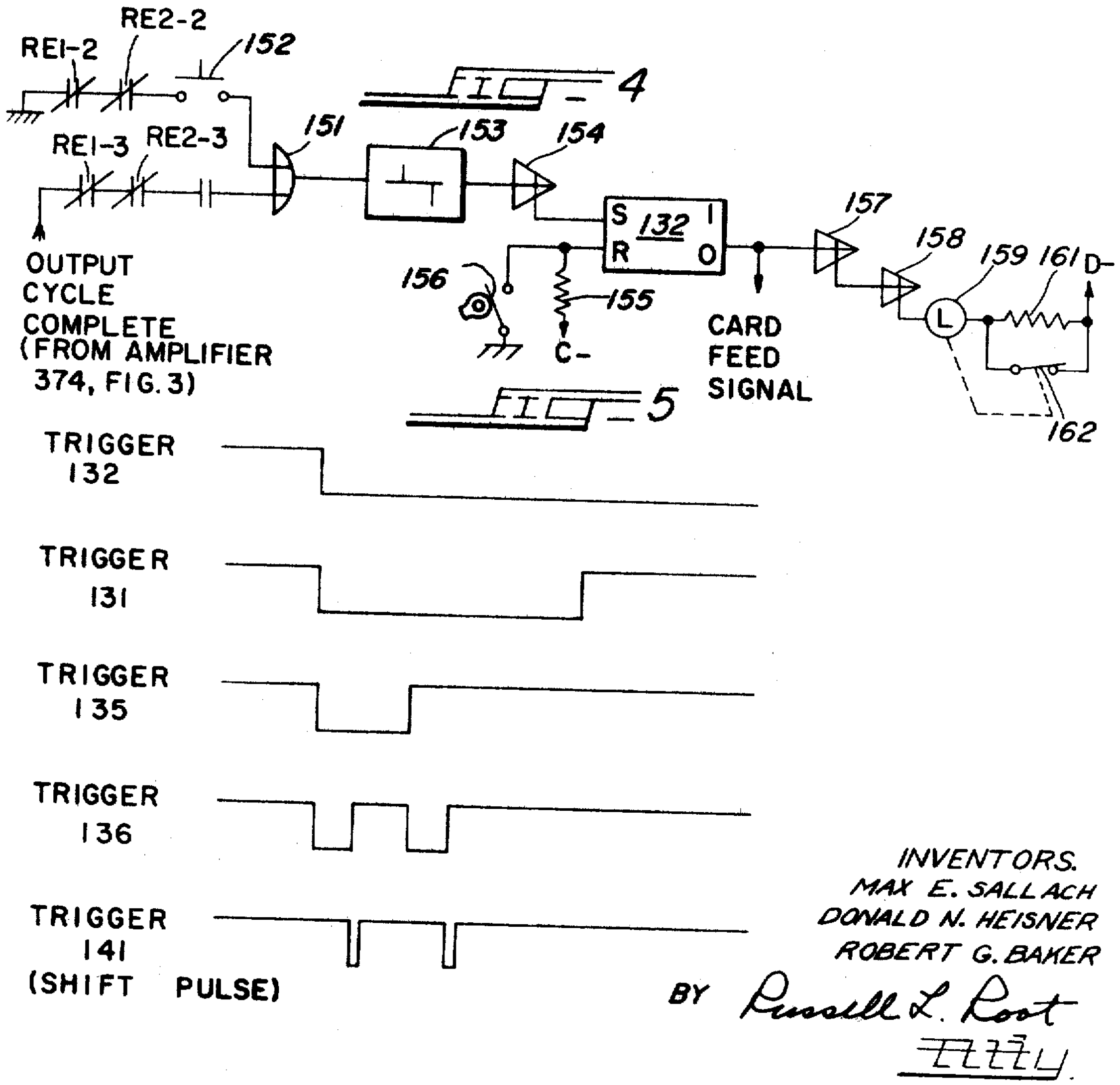
FIG. 4 is a partially schematic logic diagram of a machine control circuit for the data conversion apparatus of FIG. 1.
FIG. 5 is a timing chart for a part of the system illustrated in FIG. 3.

FIG. 4 illustrates a basic operating circuit that may be utilized in actuation of the card feed mechanism 27. The input to the circuit comprises an OR circuit 151 having two inputs. The first input to the OR circuit 151 may be connected to system ground through a manually operated card feed switch 152. Two sets of relay contacts RE1–2 and RE2–2 are included in series in the circuit comprising the switch 152 to limit the times at which a card feed cycle may be initiated. The other input to the OR circuit 151 constitutes the cycle signal indicative of completion of a full cycle of operation by the output device 56 (FIG. 1) and is taken from the amplifier 374 (FIG. 3). Relay contacts RE1–3 and RE2–3 are provided in the circuit to prevent erroneous operation.

The output of the OR circuit 151 is coupled to a pulse circuit 153 that produces a double-spike pulse that is in turn supplied to an inverting amplifier 154. The output of amplifier 154 is connected to the set input of the card feed flip-flop circuit 132.

The reset terminal of the flip-flop circuit 132 is connected to the C— supply through a resistor 155. The reset terminal is also connected to a normally open cam-actuated switch 156 that is returned to system ground. The switch 156 is closed near the end of each card feed cycle to reset the flip-flop circuit 132 and initiate a card feed signal at the "zero" output of the flip-flop circuit.

The "zero" output of the card feed flip-flop circuit 132, in addition to the connections described in connection with FIG. 3, is connected to the input of an inverting amplifier 157 having its output in turn connected to the input of a second inverting amplifier 158. The output of the amplifier 158 is connected to one terminal of a solenoid 159. The other terminal of the solenoid 159 is connected to a D.C. supply, designated as D—, through a resistor 161. A normally closed switch 162 is connected in parallel with the resistor 161 and is actuated to open position whenever the solenoid 159 is energized.

BEGINNING THE CARD FEED CYCLE

In considering the operation of the system illustrated in FIG. 3, and supplemented by FIG. 4, it should be understood that intermediate amplifier stages which do not perform separate logical functions have in many cases been omitted from the logic diagram, FIG. 3. Moreover, the power supply circuits are not shown in FIGS. 3 and 4 since the power supplies may be of conventional construction and do not constitute a critical part of the invention.

With the power supplies energized, and the system ready for operation, the clock source 46 operates continuously and supplies a high frequency (2 kHz.) clock signal from the multivibrator 352 through the AND gate 139 to the set terminal of the trigger circuit 138. The trigger circuit 138 automatically resets itself twenty-five microseconds after it is set, and is set again on the next clock pulse. Each time the trigger circuit 138 resets, an actuating signal is applied to the set terminal of the one-shot trigger circuit 141 through the OR circuit 137. The trigger circuit 141, each time it is set, resets in six microseconds, producing an output signal pulse that is supplied to the shift lines 311, 312, 314 and 317 in the shift register 45. In effect, this continuously shifts zero information through the shift register, no data having been recorded therein, maintaining the shift register 45 clear and ready for the reception of recorded data.

The first card feed cycle is initiated by closing the manually operated card feed switch 152, FIG. 4. The relay contacts RE1–2 and RE2–2 are closed, since the read error and punch error relay coils RE1 and RE2 have not been energized. Hence, closing of the switch 152 completes an electrical circuit to the pulse circuit 153, through the OR circuit 151, and supplies an output signal to the amplifier 154. This signal, in turn, is supplied to the set terminal of the card feed flip-flop circuit 132, setting that flip-flop circuit. The setting of the flip-flop circuit 132 effectively energizes the clutch solenoid 159, through the amplifiers 157 and 158. Energization of the clutch solenoid 159 starts the card feed mechanism 27 (FIG. 1) in operation and begins the feeding of the first record member toward the scanning station 26.

The setting of the card feed flip-flop circuit 132 (FIG. 4) also produces a card feed signal that is supplied to the set input terminal of the flip-flop circuits 135 and 131 in FIG. 3. The card feed signal is also utilized, through actuation of the flip-flop circuit 355, to actuate the AND circuit 139 to closed condition, and interrupt the supply of clock pulses to the flip-flop circuit 138.

The setting of the one-shot trigger circuit 131 is also effective to apply a set signal to the one-shot trigger circuit 136, through the OR circuit 125. It is thus seen that the trigger circuits 131, 135, and 136 of FIG. 3 are all set virtually simultaneously with the setting of the trigger circuit 132 of FIG. 4, the time relationship being illustrated graphically in FIG. 5.

The setting of the trigger circuits 131 and 135 applies a four-bit lead code to the four data OR circuits 91, 92, 94 and 97, since the "one" terminal of the trigger circuit 131 is connected to the OR circuits 91, 92 and 97 and the "one" terminal of the trigger circuit 135 is connected to the remaining OR circuit 94. Three hundred microseconds later, when the trigger circuit 136 automatically resets, it sets the one-shot trigger circuit 141 through the OR circuit 137. Six microseconds later (see FIG. 5) the trigger circuit 141 resets. When the circuit 141 resets, an output signal is supplied to the shift lines 311, 312, 314 and 317 of the shift register 45, recording the four bit lead code 1, 2, 4, 7 in the shift register and stepping that code forward one stage in the register to the recording circuits 301, 302, 304 and 307.

The trigger circuit 135 automatically resets 700 microseconds after being initially set by the card feed signal. When the trigger circuit 135 resets, it supplies a set signal to the one-shot trigger circuit 136, so that the circuit 136 is again actuated to its set condition. After 300 microseconds, the one-shot trigger circuit 136 again resets and again supplies a set signal to the one-shot circuit 141 through the OR circuit 137. As before, the trigger circuit 141 resets after 6 microseconds and supplies an output signal to the shift lines of the shift register 45. Because the trigger circuit 131 is still in set condition and is coupled to the OR circuits 91, 92 and 97, a special three-bit code corresponding to a data code 1, 2, 7 is recorded and stepped into the register one stage, the previously recorded lead code being stepped to maintain its position one stage in advance. The special three-bit code may constitute a line feed code for the tape punch, printer or other output device 56 (see FIG. 1). It may constitute some other function code for control of the output device, depending on the requirements of that device. It should be noted that the special three-bit code, as well as the lead code and the end code, does not correspond to any of the data codes, since the data codes each include only a maximum of two bits, so that it is readily possible to distinguish the special codes in the output interface circuit 47.

The one-shot trigger circuit 131 automatically resets 2.5 milliseconds after it is initially set (see FIG. 5). This terminates the operation of the code generators in recording the preliminary codes for initial control of the output interface 47 and the output device 56.

The leading edge of the card such as the card 23, entering the sensing station 26, is sensed by the photocells at the sensing station. An output signal is taken from one of these photocells and is supplied through the AND circuit 376 to the flip-flop circuit 149, actuating this flip-flop circuit to its set condition. The AND circuit 376 has already been enabled by the card feed signal. This produces an enabling signal that is supplied to the AND circuit 377, but this AND circuit does not now produce significant outputs.

RECORDING CODE DATA IN SHIFT REGISTER MEMORY 45

When the first code character on the record member comes into alignment with the photocells 30, 31, 32, 34 and 37 at the sensing station 26 (FIGS. 1 and 2), just two of the photocells are obscured by the two code elements constituting the code character, assuming that it is a correct code character conforming to the two-element parity code. As noted above, the parity check circuit 57 makes certain that two and only two photocells are obscured and, for each correct character, produces a parity signal. This parity signal is supplied through the OR circuit 125 (FIG. 3) to the set terminal of the one-shot trigger circuit 136 and actuates that circuit to its set operating condition.

Subsequently, the one-shot trigger circuit 136 automatically reverts to its original reset condition. This produces an output signal on the "one" output terminal of the trigger circuit, a signal that is supplied through the OR circuit 137 to set the one-shot trigger circuit 141. A very short time interval later, six microseconds with the timing relationships set forth above, the one-shot trigger circuit 141 resets, producing an output pulse on the shift lines 311, 312, 314 and 317 of the shift register 45. Either one or two of the recording circuits in the initial stage of the shift register have previously received input signals from the data flip-flop circuits 39 that have previously been set by the sensing action of the photocells; the variation in the number of data bits recorded in the initial stage of the shift register is occasioned by the fact that parity information is not translated to or recorded in the shift register. Consequently, the shift pulse supplied to the shift lines in the register 45 advances the recorded data one stage into the shift register. Moreover, the special code data previously recorded in the shift register memory is also advanced one stage.

The data flip-flop circuits 39 (FIG. 1) are reset, after the information they contain has been recorded in the shift register memory 45. Moreover, and as described above, the scanning operation carried out by the sensing photocells and the scanner circuits 38 is effectively blanked for a period of time sufficient to permit the code character just sensed to clear the scanning station 26. Subsequently, the next code character is sensed and recorded in the shift register memory 45, the shifting of the data into the register being controlled by the output pulses from the trigger circuit 141. This recording operation is continued until all of the individual code characters from a given record member are recorded, without change in the code designations other than the omission of the parity level of the code.

For a particular code character, it may happen that one of the individual code elements is so poorly imprinted as to prevent effective sensing. It may also happen that an extraneous marking is aligned with the proper code elements of the code character so that the sensing photocells detect what appears to be three or more code elements in a single code character. Under either circumstance, the parity check circuit 57 develops a nonparity signal which provides for repetitive scanning of the code character to attempt to detect the correct information that character as described above. However, if the defect cannot be avoided by repetitive scanning, that particular code character is not recorded in the shift register memory 45 because there is no parity signal supplied to the OR circuit 125 (FIG. 3) to actuate the recording operation. This also creates a discrepancy in the count in the counter 52 as described more fully hereinafter. A preferred construction for the parity check circuit 57 and other elements of the parity control apparatus are described in the copending application of L. R. McMillen filed concurrently herewith.

END OF CARD READING CYCLE

After the last character code position on the card that is to be sensed has passed the sensing station 26, the synchronizing disc photocell 42 develops an output signal that is applied to all of the data flip-flop circuits 39 (FIG. 1). This signal resets all of the data flip-flop circuits and maintains them in reset condition so that no more data can be sensed or recorded.

As the trailing end of the record member nears the sensing station, and after all code data has been scanned, the cam-actuated switch 156 (FIG. 4) is closed. This is effective to supply a reset signal to the card feed flip-flop circuit 132, resetting that circuit. The resetting of the card feed flip-flop circuit 132 produces an output signal that is inverted in the amplifier 134 (FIG. 3) and applied to the set terminal of the one-shot trigger circuit 133.

The setting of the one-shot trigger circuit 133 produces an output signal on the "one" terminal of that flip-flop circuit, a signal that is supplied to the OR circuits 91, 94 and 97. This signal is also supplied through the OR circuit 125 to the set terminal of the one-shot trigger circuit 136, setting the latter circuit. This initiates the recording of a special three-bit end code 1, 4, 7 which is recorded in the shift register 45 just as in the case of the other special codes described above.

INITIATION OF THE READOUT OPERATION

When the trigger circuit 133 subsequently resets, an actuating signal is supplied to the flip-flop circuit 354 in the clock source 46, setting the flip-flop 354. The flip-flop circuit 354, in turn, supplies an enabling signal to the AND circuit 353, which also receives a synchronizing input signal from the multivibrator 352. Accordingly, the AND circuit 353 applies a setting signal to the flip-flop circuit 355. The resulting actuation of the flip-flop circuit 355 to its set condition results in an output signal from the flip-flop circuit to the AND circuit 139 so that high frequency clock pulses from the multivibrator 352 are again supplied through the AND circuit 139 to the one shot trigger circuit 138. Thereafter, on each clock pulse, the trigger circuit 141 is actuated to produce shift pulse signals that are supplied to the shift lines in the register 45 to periodically advance the recorded data through the shift register memory. The necessity for this auxiliary circuit for advancing the data through the shift register memory will be recognized when it is understood that the code messages on the particular record members being utilized for control purposes may each include a substantially smaller number of code characters than the capacity of the shift register memory.

At the time the advancement of the recorded data through the shift register 45 is initiated, the counter 52 (FIG. 1), is started. The counter is reset to its initial count representative of a zero condition (the actual count in the counted may be some other number if a complementary counter is employed). Each shift pulse initiated by resetting of the trigger circuit 138 (FIG. 3) is supplied to the counter through the AND circuit 388 and the OR circuit 389. Thus, the counter counts the number of shift pulses required to move the recorded code data through the shift register 45 until the lead code reaches the output stage of the shift register.

Ultimately, the initial recorded code character in the shift register memory 45, which is the special lead code 1, 2, 4, 7, is advanced to the output stage of the shift register memory comprising the recording devices 321, 322, 324 and 327. On the next shift pulse, this four bit code is effectively read out of the shift register memory, producing output signals of predetermined polarity and amplitude from all four of the output amplifiers 341, 342, 344 and 347. These four output signals from the amplifiers are all required to enable the lead code recognition circuit comprising the AND gate 49.

The resulting output signal from the AND gate 49 is supplied to the AND circuit 382 in the lead code gate 51. The AND circuit 382 produces an output signal, provided two additional conditions are satisfied. Thus, the signal from the AND gate 49 must coincide with an output signal from the AND gate 381 connected to the message length switches 53, indicating that the lead code has been recognized in coincidence with a count in the counter 52 representative of the difference between the shift register capacity and the number of code characters required for each code message. In addition, the AND gate 139 must have been enabled and must be supplying clock pulses to the AND gate 382. The occurrence of all three of these conditions indicates that a correct number of data characters have been sensed and recorded in the shift register memory 45 and is a check upon operation of the shift register memory.

The output signal from the AND gate 382 sets the flip-flop circuit 383 in the lead code gate circuit 51. This produces an output signal that is supplied to the amplifier 384, energizing the amplifier. The coupling circuit from the amplifier 384 to the AND gate 139, comprising the diode 385, effectively shunts the enabling signal for the AND gate 139, "closing" that gate and interrupting advancement of the recorded data through the shift register memory 45 that has heretofore gone forward in response to the clock pulses from source 46. The output from the amplifier 384 also energizes the relay coil R5, permitting subsequent operation of the code translation circuit described hereinafter in connection with FIG. 6.

The output signal from the "one" terminal of the flip-flop circuit 383 also sets the trigger circuit 351, the contacts RE1–1 and RE2–1 both being open. Thereafter, the trigger circuit 351 automatically resets itself; it will be recalled that the reset time for this trigger circuit is selected to suit the operational needs of the output device 56 (FIG. 1) and may be of the order of five to sixty milliseconds. The setting of the trigger circuit 351 produces an output at its "one" terminal that sets the trigger circuit 138 and that also pulses the counter 52 through the OR circuit 389. When the trigger circuit 138 resets (twenty-five microseconds later) the shift signal to the shift register memory is again supplied by the OR circuit 137 and the trigger circuit 141 as described above, advancing the next recorded character to the output stage of the shift register memory.

When the lead code gate flip-flop circuit 383 is set, as described above, the enabling output signal to the AND circuit 388 is interrupted; hence, the counter is no longer actuated by the output signals from the trigger circuit 138. From this point on, counter operation is controlled by the signals from the trigger circuit 351, but each shift operation is still counted.

Figure 6:
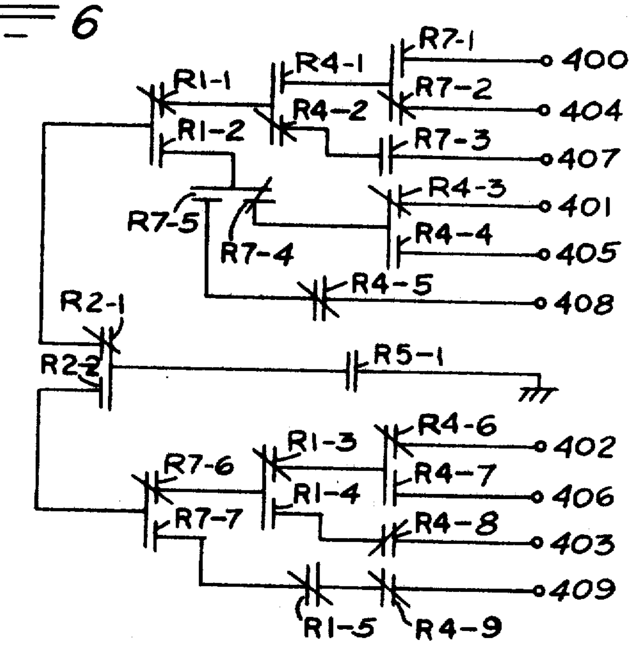
FIG. 6 is a schematic diagram of a code translation circuit incorporated in the data conversion apparatus of FIG. 1.

The second recorded code is the special 1, 2, 7 code. This particular code is not translated by the translator circuit (FIG. 6). However, it can be sensed by a separate circuit (not shown) actuated by the relays R1, R2 and R7 in the interface unit 47 to supply a function code to the output device 56 to initiate a paper feed, carriage return, or other function in the output device.

The trigger circuit 351 is set again, almost immediately after resetting by a signal received via the S+ input, originated by the output interface when the code use has been completed. Once more, the trigger circuit rests after a given time interval, again setting trigger circuit 138 and pulsing the counter through OR circuit 389. When the trigger circuit 138 resets, automatically, the third recorded code is advanced to the output stage of the shift register memory 45. This is the first data code character derived from the record member code message, assuming only two special codes have been recorded at the beginning of the machine cycle. One or two of the relays R1, R2, R4 and R7 are energized, actuating the code translation circuit of the interface unit (see FIG. 6, explained hereinafter). This data code character is printed, punched, or otherwise utilized in the output device 56 (FIG. 1) before trigger circuit 351 can cycle another time.

The cyclic read out operation proceeds, as described above, for each recorded character in the shift register memory 45. Each character is read out, by means of the amplifiers 341, 342, 344 and 347 and the associated relays R1, R2, R4 and R7. And each character is counted.

TERMINATION OF THE READOUT OPERATION

When the special end code 1, 4, 7 reaches the output stage of the shift register memory 45, it is recognized by the end code AND gate 48, which receives the requisite identification signals from the amplifiers 341, 342, 344 and 347. The signals from the amplifiers 341, 344 and 347 indicate the presence of recorded code bits whereas the output from the amplifier 342 is indicative of the absence of a recorded code bit.

The output signal from the end code AND gate 48 is supplied to the AND circuit 362. The AND gate 362 is actuated provided it also receives a signal from the AND gate 363 that is connected to the counter 52. The AND gate 363 produces the requisite output signal to enable the AND gate 362 only on a count indicative of the number of shift operations in the shift register memory 45 sufficient to record the complete data message and to advance the last character in that message, the special end code, to the output stage of the shift register. Thus, the end code is utilized as a check on the accuracy of performance of the control system.

Assuming that the end code is recognized at the proper time as determined by the output signal from the counter AND gate 363, the AND gate 362 produces an output signal that is supplied to the AND gate 364. The AND gate 364 also requires a second input derived from the amplifier 367 and the circuit 368, 369 that connects that amplifier to the "one" output of the trigger circuit 351. This signal is present, with the result that the AND circuit 364 produces an output that is supplied to the flip-flop circuit 372 and sets that flip-flop circuit.

The setting of the flip-flop circuit 372 produces an output signal on the zero terminal thereof that is supplied to the flip-flop circuit 383 in the lead code gate 51 to reset the flip-flop circuit 383. The flip-flop circuit 383, when it is reset, produces an output signal on its zero terminal that enables the AND circuit 388 for subsequent operations. This same signal also resets the flip-flop circuit 149.

The setting of the flip-flop circuit 372 also produces an output signal on its one terminal that is supplied to the AND gate 373. The resetting of the flip-flop circuit 149, as described above, produces an output signal indicative of completion of the readout operation. The "one" terminal of flip-flop 351, which at this time indicates that the output cycle has been completed, is connected to the AND circuit 373. Consequently, the AND circuit 373 produces an output signal that actuates the amplifier 374 and, in turn, the amplifier 357, so that these amplifiers produce actuating signals that indicate the completion of the readout operation.

The output signal from the amplifier 374 is supplied to the OR circuit 151 (FIG. 4) to initiate a new card feed operation and start the next scanning cycle for the next record card. The next cycle of operation of the scanning system, the shift memory, and the remainder of the control apparatus proceeds as described above, the only difference being that it is initiated by the output cycle completion signal supplied to the OR circuit 151 in FIG. 4 instead of by the closing of the switch 152 that started the feed of the first record member.

The output signal from the amplifier 357, on the other hand, is applied to the flip-flop circuit 372 to reset that circuit and prepare it for a further operation. The connection from the amplifier 357 to the flip-flop circuit 355 in the clock source 46, on the other hand, assures readiness of the clock source for operation as described above.

The setting of the flip-flop circuit 372, as described above, occurs at an intermediate point in the final printing, punching, or other operating cycle of the output device controlled by the system. For example, where a printer is utilized, the flip-flop circuit 372 is likely to be set at an intermediate point in a carriage return cycle. In order to assure complete clearing of the shift register memory, and particularly the information in the output stage of the shift register, the trigger circuit 351 is actuated one more time. This is accomplished by closing of the relay contacts R6–1 to apply an additional set signal to the trigger circuit 351. This produces one additional shift pulse and is effective to assure shifting of the end code output of the final stage of the shift register.

A brief analysis of the operations of the counter 52, the message length switches 53 (FIG. 1) and the AND circuits 363 and 381 (FIG. 3) will serve to indicate how messages of varying length, on different groups of record members, are accommodated by the control system of the present invention. It may first be assumed that there are $n$ stages in the shift register 45. The number $m$ of data characters in each data message on the record members is a constant for each group of record members processed together, but may vary from group to group. For the record card 23 and the others being processed (FIG. 1), $m=27$. The number $k$ of the special code characters (lead code, function codes, end code) is a constant for the system; in the specific system described herein, $k=3$.

It will be apparent that the number $s$ of shift pulses required to advance the recorded data through the shift register, after recording the end code, to bring the lead code to the output stage of the shift register is $$s=n-(k+m)$$

The number $s$ is the count required to be present in the counter in coincidence with recogition of the lead code character by the gate 49 for a correct read-in operation, with all data characters meeting the parity requirements. That count changes for changes in data message length $m$; hence, the provision of the message length switches 53 to modify the count at which the AND circuit 381 is enabled (FIG. 3) and thereby modify the count employed in determiing a read-in error. The error determination is made by the AND circuit 382.

The total number $c$ of shift pulses required to advance the recorded data through the shift register 45 to bring the end code to the output stage of the register, on the other hand, is a constant. That is, $$c=s+k+m$$

but, substituting the value given above for $s$, $$c=n-(k+m)+k+m=n$$

Hence, the total count in the counter that should correspond to recognition of the end code by the AND circuit 48 is a constant equal to the number of stages in the shift register. The AND gate 363 that establishes the presence of this count can be permanently connected to the counter and requires no adjustment.

PUNCH ERROR DETERMINATION

The AND circuit 366 is the principal operation-determining element in the punch error gate 55. The AND circuit 366 receives a continuous enabling signal from the amplifier 365 at all times when there is no signal available from the AND circuit 362 to indicate coincidence of an end code and a correct count from the counter. Moreover, the AND gate 366 is provided with a second enabling signal from the amplifier 367 each time the flip-flop circuit 351 is reset.

In the event that the end code recognition AND gate 48 identifies an end code before the correct count for completion of a readout operation is indicated by the counter 52 through the AND gate 363, the output signal from the AND circuit 48 is supplied through the OR circuite 361 to the AND gate 366 and produces an error output signal from the AND gate 366. Alternatively, in those instances in which the completion-of-readout count signal is produced by the AND gate 363 before the end code is recognized by the AND gate 48, the signal from the AND gate 363 is supplied through the OR circuit 361 to the AND circuit 366 and produces an output error signal from the AND circuit 366. Either circumstance is indicative of an error in operation of the system.

Whenever an error signal is produced by the AND gate 366, the flip-flop circuit 371 is set. The setting of this flip-flop circuit energizes the relay coil RE2. As a consequence, the contacts RE2–1 are closed, interrupting the set signal to the trigger circuit 351 and preventing further readout of any additional data that may be recorded in the shift register memory 45. In addition, the contacts RE2–2 and RE2–3 are opened in the card feed circuit, FIG. 4, so that a new cycle of operation cannot be initiated until corrective steps are taken by the system operator. The energization of the punch error gate relay RE2 can also be utilized to actuate a suitable visual or audible alarm to inform the system operator that an error has occurred and that erroneous data has been recorded by the output device 56 (FIG. 1). Resetting of the punch error flip-flop circuit 355 to provide for continued operation of the system may be effected by an appropriate manually actuated electrical circuit connected to the reset terminal of the flip-flop circuit (not shown). The auxiliary reset circuit for this flip-flop is provided to assure that the flip-flop starts its operation in the requisite reset condition to enable operation of the system.

READ ERROR DETERMINATION

As described above, the AND gate 139 in the output of the clock source 46 is enabled at the time that a given record member is completely scanned, immediately following recording of the end code in the shift register memory 45. A error in the reading or sensing operation as applied to the record member is indicated by a variation between the recognition of the lead code and the occurrence of the output from the AND circuit 381 that indicates when the lead code should appear in the output stage of the shift register memory. As noted above, this may happen when one or more characters have not satisfied the requisite parity condition. A malfunction in the recording operation can produce the same result. With such an error present, the lead code is identified by the AND gate 49 at a time when there is no enabling signal available from the AND gate 381 so that the AND gate 382 does not produce an output signal to set the flip-flop circuit 383 and initiate a readout operation with respect to the data recorded in the shift register memory 45.

Under these circumstances, the failure to set the flip-flop circuit 383 results in continued operation of the clock source 46 and the continued application of clock pulses to the trigger circuit 138 because, as noted above, the setting of the flip-flop circuit 383 is necessary to cut off the clock pulse output from the AND circuit 139. Thus, the AND circuit 139 continues to supply clock pulses to the trigger circuit 138 and each clock pulse produces a shift pulse, through the circuits 138, 137 and 141 which are applied to the shift lines in the memory 45. Thus, the data recorded in the shift register memory 45 is advanced, character by character, and shifted out of the memory without being supplied to the output device 56 (FIG. 1).

Subsequently, the continuing application of shift pulses to the shift register, and the counting of those pulses by the counter 52, reaches a count that actuates the AND gate 363. The AND gate 363 supplies an enabling signal to the AND gate 377. The flip-flop circuit 149 remains in its set condition, so that both input signals required for actuation of the AND gate 377 are present. Accordingly, the AND gate 377 produces an output signal that sets the read error flip-flop circuit 378.

When the rear error flip-flop circuit 378 is set, the read error relay coil RE1 is energized. As a consequence, the contacts RE1–1 are closed, preventing subsequent operation of the readout flip-flop circuit 351 (FIG. 3). Moreover, the contacts RE1–2 and RE1–3 in the card feed circuit of FIG. 4 are opened so that a new card feed operation cannot be initiated. An appropriate alarm circuit (not shown) may also be actuated by energization of the read error relay RE1 so that the system operator knows a reading error has occurred and corrective action is required. It is thus seen that the rear error gate produces the same basic result as the punch error gate but identifies the source of the error as relating to the sensing or recording operations and not to the readout operation.

CODE TRANSLATION

FIG. 6 illustrates a typical code translator circuit for translating the code data to a different code directly usable by the output device 56. The circuit shown in FIG. 6 translates the code illustrated in Table I above to a decimal code of the kind frequently used in card punches and other business machines. It should be understood that the circuit of FIG. 6 is presented merely as an illustration and that corresponding circuits may be utilized to translate the input code to other output codes such as the American Standard Code for Information Interchange (ASCII) as employed in the operation of many high speed printers and tape punches.

In the circuit illustrated in FIG. 6, the terminals 400–409 at the hight-hand side of the drawing are the output terminals for the circuit. The final digit in each of the reference numerals 400–409 represents the decimal code value identified by that terminal. The presence of a particular decimal value is indicated by completion of a circuit to system ground from the output terminal. The circuits are completed through contacts of the relays R1, R2, R4 and R7, the contacts being identified, in each instance, by a reference character that includes the relay designation. Thus, for the decimal value one, the circuit is completed from the terminal 401 through the relay contacts R4–3, R7–4, R1–2, and R2–1. In addition, for all code values, the contacts R5–1 must be closed. Thus, as noted above, the relay R5 must be energized for any code character readout operation. In considering the arrangement of the contacts for the circuit to the output terminal 401, it is seen that the contacts R4–3, R7–4, and R2–1 are all normally closed contacts; the terminal 401 cannot be connected to ground if any of the relays R4, R7 and R2 are energized. On the other hand, the contacts R1–2 are normally open contacts so that the relay R1 must be energized to produce the output at the terminal 401. This is the correct code designation for the numerical value "one" in the input code; see Table I.

One further example may be considered with respect to the code translation circuit of FIG. 6. For the numerical value "eight," the input code is one and seven as shown by Table I. For the terminal 408 in the circuit of FIG. 6 to be connected to ground, the contacts R7–5 and the contacts R1–2 must close to indicate that the relays for the corresponding code levels in the output of the shift memory have been energized. By the same token, the relays for the two remaining input code levels, R4 and R2, must remain de-energized so that the contacts R4–5 and R2–1 remain in their normally closed condition.

From FIG. 6, taken in connection with the foregoing exemplary description, it will be seen that the code translation is complete for each numerical value. As noted above, a different output code merely requires a different circuit arrangement for the contacts of the output relays of the shift register memory.

We claim:

1. A control system for controlling a printing machine, card punch or other output device in response to data messages encoded in accordance with a first data code, each message including *m* data characters and each data character comprising a given plurality of *p* of data bits, with *m* being subject to variation between different groups of data messages that may be derived from different sources, said system comprising:

a shift register of *n* stages starting with an input stage and ending with an output stage, with $n>m$, each shift register stage including $p$ individual recording devices so that the shift register has a capacity of $n$ complete data characters, said shift register including shift circuits interconnecting said stages for stepping data recorded therein from said input stage toward said output stage;

input circuit means, electrically coupled to said input stage of said shift register, for recording a complete data message in said shift register one character at a time;

an output interface circuit, coupled to said output stage of said shift register and to said output device, for receiving a data message from said shift register one character at a time and for actuating said output device in accordance therewith;

input shift means, connected to said input circuit means, for applying a shift pulse to said shift circuits each time a new character is recorded in said input stage to advance all recorded data one stage in said shift register;

readout shift means for applying shift pulses to said shift circuits to advance recorded data through said output stage of said shift register to said output interface circuit;

a clock source for generating a clock signal;

first clock gate means for applying said clock signal to said shift circuits, upon completion of the recording of a complete data message, to advance that data message rapidly through said shift register until the first character in the message reaches the output stage of the register;

second clock gate means for applying said clock signal continuously to said shift circuits, upon completion of the readout of a complete data message, to maintain the shift register in cleared condition until recording of a further data message is initiated;

a counter for counting shift pulses supplied to said shift register from said input shift means, said readout shift means, and said first clock gate means; and first and second error gate means, each coupled to said counter and to said shift register, for detecting errors in the recording of data in said shift register and in the readout of data therefrom in accordance with the count in said counter when certain characters appear in the output stage of the shift register.

2. A control ssytem according to claim 1 in which said error gate means comprises a read error gate coupled to said counter and to the output stage of said shift register, for determining whether the first character to reach the output stage of said shift register occurs in coincidence with a predetermined count $s$ in said counter indicative of the correct number of characters in a recorded code message, where $s=n-(k+m)$, $k$ being the number of any special characters added in recording a message in the shift register.

3. A control system according to claim 1 in which said error gate means comprises an output error gate coupled to said counter and to the output stage of said shift register, for determining whether the last character to reach the output stage of said shift register occurs in coincidence with a predetermined count of $n$ in said counter indicative of the correct number of characters in a recorded code message.

4. A control system for controlling a printing machine. card punch or other output device in response to data messages encoded in accordance with a first data code, each message including $m$ data characters and each data character comprising a given plurality $p$ of data bits, comprising:

a shift register of $n$ stages starting with an input stage and ending with an output stage, with $n>m$, each shift register stage including $p$ individual recording devices so that the shift register has a capacity of $n$ complete data characters, said shift register including shift circuits interconnecting said stages for stepping data recorded therein from said input stage toward said output stage;

input circuit means, electrically coupled to said input stage of said shift register, for recording a complete data message in said shift register one character at a time;

an output interface circuit, coupled to said output stage of said shift register and to said output device, for receiving a data message from said shift register one character at a time and for actuating said output device in accordance therewith;

input shift means connected to said input circuit means, for applying a shift pulse to said shift circuits each time a new character is recorded in said input stage to advance all recorded data one stage in said shift register;

readout shift means for applying shift pulses to said shift circuits to advance recorded data through said output stage of said shift register to said output interface circuit;

a clock source for generating a clock signal;

first clock gate means for applying said clock signal to said shift circuits, upon completion of the recording of a complete data message, to advance that data message rapidly through said shift register until the first character in the message reaches the output stage of the register;

code generator means for generating and recording special lead and end code characters, distinctively different from any of said data code characters and from each other, at the beginning and at the end of said data message, respectively, in said shift register;

a counter for counting shift pulses supplied to said shift register from said input shift means, said readout shift means, and said first clock gate means; and first and second error detection means, coupled to said counter and to the output stage of said shift register, for utilizing said end and lead code characters to detect inaccurate read-out and read-in operations, respectively, by said control system.

5. A control system according to claim 2 and further comprising additional code generator means for recording in said shift register at least one function code character, for controlling a given function of said output device, intermediate one of said lead and end code characters and the data characters of each data message.

6. A control system according to claim 4 in which:

said first error detection means for detecting inaccurate read-out operation comprises a coincidence circuit for determining whether said end code reaches the output stage of said shift register in coincidence with a count of $n$ in said counter.

7. A control system according to claim 4, further comprising:

message length determining means, connected to said counter, for determining when said counter reaches a count $s$ equal to the difference between the number of stages $n$ in said shift register memory and the total sum of the characters, including special characters, recorded in the shift register for a data message of correct length; and in which said second error detection means for detecting inaccurate read-in operation comprises a coincidence circuit for determining whether said lead code reaches the output stage of said shift register in coincidence with a count of $s$ in said counter.

8. A control system according to claim 7 in which said message length determining means is adjustable to different counts $s$ to accommodate data messages of varying length.

9. A control system according to claim 2 in which said output interface circuit comprises a code translation circuit, coupled to the output stage of said shift register, for translating the individual data characters of each data message from said first data code to a second data code directly usable by said output device;

said second (read-in) error detection means being coupled to said code translation circuit to prevent operation thereof whenever a read-in error is detected.

10. A control system according to claim 1, and further comprising second clock gate means for applying said clock signal to said shift circuits, during time intervals in which there is no data recorded in and none being recorded in said shift register, to maintain said shift register in cleared condition but without counting shift operations in said counter during such time intervals.

11. A control system according to claim 5, in which said input circuit means comprises a given number of OR circuits, one coupled to each recording device in the input stage of said shift register, and each of said code generators comprises at least one monostable circuit electrically connected to a preselected number of said OR circuits for actuating preselected ones of said input recording devices independently of any data message input.

12. A control system according to claim 1 in which each of said error detection means includes an error relay actuated upon detection of an error condition, and in which each error relay includes contacts connected to said readout control circuit to inhibit further readout of code characters upon detection of an error.

References Cited

UNITED STATES PATENTS

| | | | |
|---|---|---|---|
| 3,012,230 | 12/1961 | Galas | 340—172.5 |
| 3,129,409 | 4/1964 | Perley | 340—172.5 |
| 3,142,042 | 7/1964 | Te-An Ling | 340—172.5 |
| 3,159,809 | 12/1964 | Fierston | 340—146.1 |
| 3,307,153 | 2/1967 | Bauer | 340—172.5 |
| 3,368,203 | 2/1968 | Loizides | 340—172.5 |
| 3,372,376 | 3/1968 | Helm | 340—146.1 |

PAUL J. HENON, Primary Examiner

R. F. CHAPURAN, Assistant Examiner

UNITED STATES PATENT OFFICE
CERTIFICATE OF CORRECTION

Patent No. 3,544,967 Dated December 1, 1970

Inventor(s) Max E. Sallach et al

It is certified that error appears in the above-identified patent and that said Letters Patent are hereby corrected as shown below:

Column 2, line 6, change "diode" to -- code --. Column 6, shift the "X" in line 1 of Table I, from column 2 to column 1; shift the "X" in line 2 of Table I, from column 1 to column 2. Column 24, lines 42 and 72, the claim reference numeral "2", each occurrence, should read -- 4 --. Column 25, line 6 and Column 26, line 1, the claim reference numeral "1", each occurrence, should read -- 4 --.

Signed and sealed this 8th day of June 1971.

(SEAL)
Attest:

EDWARD M.FLETCHER,JR.
Attesting Officer

WILLIAM E. SCHUYLER, JR.
Commissioner of Patents

RM PO-1050 (10-69)

USCOMM-DC 60376-P69
☆ U.S. GOVERNMENT PRINTING OFFICE : 1969 O—366-334